(12) United States Patent
Shirasaki et al.

(10) Patent No.: US 10,458,355 B2
(45) Date of Patent: Oct. 29, 2019

(54) ENGINE CONTROL DEVICE AND ENGINE CONTROL METHOD

(71) Applicant: Mitsubishi Electric Corporation, Tokyo (JP)

(72) Inventors: Mitsuaki Shirasaki, Tokyo (JP); Shuichi Wada, Hyogo (JP); Kenichi Yamagata, Tokyo (JP); Katsuya Monguchi, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/712,681

(22) Filed: Sep. 22, 2017

(65) Prior Publication Data
US 2018/0266353 A1  Sep. 20, 2018

(30) Foreign Application Priority Data
Mar. 17, 2017  (JP) ................................. 2017-052676

(51) Int. Cl.
  *F02D 41/14*  (2006.01)
  *F02D 41/18*  (2006.01)
  (Continued)

(52) U.S. Cl.
  CPC ....... *F02D 41/182* (2013.01); *F02D 41/1441* (2013.01); *F02D 41/1446* (2013.01);
  (Continued)

(58) Field of Classification Search
  CPC ............. F02D 41/1446; F02D 41/1447; F02D 41/1454; F02D 41/1455; F02D 41/1458;
  (Continued)

(56) References Cited

U.S. PATENT DOCUMENTS 4,150,562 A * 4/1979 Nielsen ............... F02D 41/1479
                                                                 123/694
4,337,745 A * 7/1982 Pomerantz ......... G01N 27/4065
                                                                 123/694
(Continued)

FOREIGN PATENT DOCUMENTS

JP        53-141832      12/1978
JP        62-95457 A      5/1987
(Continued)

OTHER PUBLICATIONS

Communication dated Jan. 16, 2018 from the Japanese Patent Office in counterpart application No. 2017-052676.
(Continued)

*Primary Examiner* — Erick R Solis
(74) *Attorney, Agent, or Firm* — Sughrue Mion, PLLC; Richard C. Turner

(57) ABSTRACT

Provided is an engine control device for correcting output characteristics of an oxygen sensor and performing air-fuel ratio feedback control. The engine control device includes various sensors for detecting operating state information of an engine, an oxygen sensor, and air-fuel ratio feedback controller to adjust an amount of fuel injected into the engine, on the basis of the operating state information and an output voltage value of the oxygen sensor, wherein the air-fuel ratio feedback controller calculates, in accordance with the operating state information based on detection results from the various sensors, a coefficient for correcting the output voltage value, implements air-fuel ratio feedback control on the basis of an air-fuel ratio feedback control correction amount calculated using a corrected oxygen sensor output voltage value calculated on the basis of the coefficient, and adjusts the amount of fuel injected into the engine.

15 Claims, 8 Drawing Sheets

(51) Int. Cl.
*F02D 41/30* (2006.01)
*F01N 3/10* (2006.01)
*F02D 41/06* (2006.01)

(52) U.S. Cl.
CPC ..... *F02D 41/1447* (2013.01); *F02D 41/1454* (2013.01); *F02D 41/1455* (2013.01); *F02D 41/1458* (2013.01); *F02D 41/1482* (2013.01); *F02D 41/1483* (2013.01); *F02D 41/1486* (2013.01); *F02D 41/1487* (2013.01); *F02D 41/30* (2013.01); *F01N 3/101* (2013.01); *F01N 2430/06* (2013.01); *F01N 2560/025* (2013.01); *F01N 2900/0408* (2013.01); *F01N 2900/0416* (2013.01); *F01N 2900/08* (2013.01); *F01N 2900/1402* (2013.01); *F01N 2900/1404* (2013.01); *F02D 41/062* (2013.01); *F02D 2200/021* (2013.01); *F02D 2200/0404* (2013.01); *F02D 2200/0406* (2013.01); *F02D 2200/0414* (2013.01); *F02D 2200/0802* (2013.01); *F02D 2200/0804* (2013.01); *Y02A 50/2324* (2018.01); *Y02T 10/22* (2013.01)

(58) Field of Classification Search
CPC ............. F02D 41/1486; F02D 41/1487; F02D 41/182; F02D 2200/0802; F02D 2200/0804; F01N 2560/025; F01N 2900/1404
USPC .................. 701/104, 109; 123/689, 693–696
See application file for complete search history.

(56) References Cited

U.S. PATENT DOCUMENTS

| | | | | |
|---|---|---|---|---|
| 4,472,262 A * | 9/1984 | Kondo | ............... | G01N 27/4065 204/408 |
| 4,763,629 A * | 8/1988 | Okazaki | .............. | F02D 41/1479 123/683 |
| 4,875,990 A * | 10/1989 | Kodachi | ............ | G01N 27/4067 204/408 |
| 5,249,453 A * | 10/1993 | Usami | ................ | G01N 27/4065 204/408 |
| 5,322,047 A * | 6/1994 | Oliu | .................... | F02D 41/1446 123/676 |
| 5,983,878 A * | 11/1999 | Nonaka | ................. | F02B 61/045 123/679 |
| 8,959,987 B2 * | 2/2015 | Fosaaen | ............. | F02D 41/1446 73/114.72 |
| 9,671,311 B2 * | 6/2017 | Fey | ...................... | G01M 15/104 |
| 2003/0089358 A1 * | 5/2003 | Ohkuma | ............ | F02D 41/1456 123/694 |

FOREIGN PATENT DOCUMENTS

| | | |
|---|---|---|
| JP | 4607163 B2 | 1/2011 |
| JP | 2013-178227 A | 9/2013 |
| JP | 5851569 B1 | 2/2016 |

OTHER PUBLICATIONS

Communication dated Oct. 3, 2017 from the Japanese Patent Office in counterpart application No. 2017-052676.

* cited by examiner

FIG. 5

| O2 HEATER PWM DUTY [%] (*1) | 100 | 90 | 80 | 70 | 60 | 50 | 40 | 30 | 20 | 10 | 0 |
|---|---|---|---|---|---|---|---|---|---|---|---|
| SENSOR TEMPERATURE [°C] WHEN AIR-FUEL RATIO = 13 | 777 | 754 | 731 | 708 | 680 | 655 | 627 | 593 | 561 | 526 | 490 |
| SENSOR TEMPERATURE [°C] WHEN AIR-FUEL RATIO = 14.7 | 840 | 820 | 798 | 776 | 751 | 725 | 698 | 670 | 640 | 610 | 572 |
| TEMPERATURE DIFFERENCE [°C] | 63 | 66 | 67 | 68 | 71 | 70 | 71 | 77 | 79 | 84 | 82 |

(*1) SENSOR TEMPERATURE IS CHANGED BY ALTERING PWM DUTY OF VOLTAGE FOR ENERGISING O2 HEATER

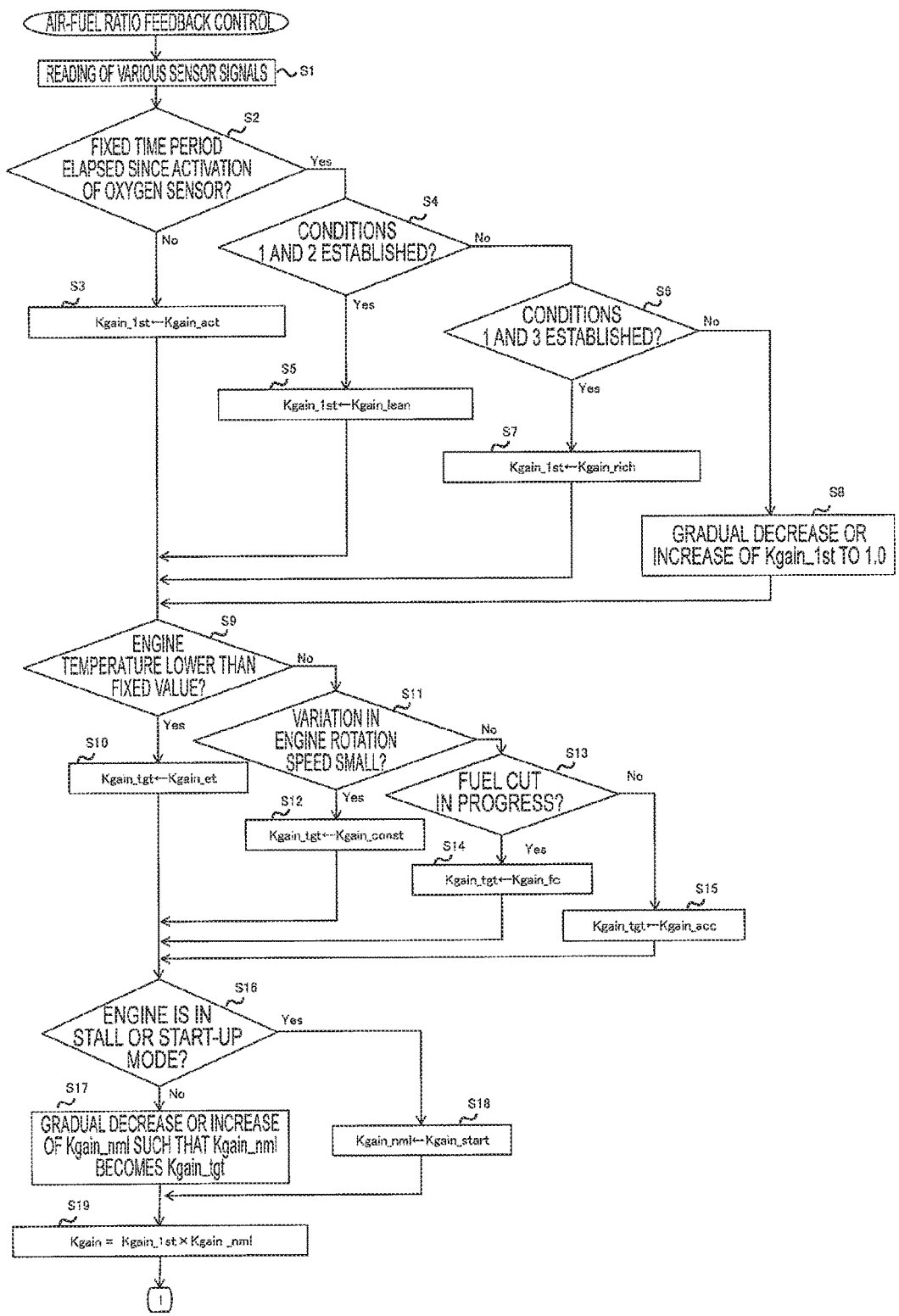

ENGINE CONTROL DEVICE AND ENGINE CONTROL METHOD

BACKGROUND OF THE INVENTION

1. Field of the Invention

The present invention relates to engine control for a vehicle or the like in which an oxygen sensor, the sensor output voltage of which changes significantly in the vicinity of the stoichiometric air-fuel ratio in response to a concentration of oxygen in exhaust gas of an engine, is provided in a single cylinder or multiple cylinders, and more specifically to an engine control device and an engine control method in which an actual air-fuel ratio is feedback-controlled to the stoichiometric air-fuel ratio by adjusting a fuel injection amount on the basis of an oxygen sensor output voltage.

2. Description of the Related Art

In conventional engine control, air-fuel ratio feedback control based only on a determination result as to whether an air-fuel ratio is in a rich state or a lean state is implemented using an oxygen sensor, the sensor output voltage of which changes significantly in the vicinity of the stoichiometric air-fuel ratio.

In line with the strengthening of exhaust gas regulations it has, in recent years, become necessary to elicit rapid convergence to the stoichiometric air-fuel ratio, even in a transient operating state. For this reason, a feature has been conceived in which an output voltage of an oxygen sensor, which serves as an output value thereof, is converted into air-fuel ratio data, an actual air-fuel ratio is calculated from the air-fuel ratio data, and air-fuel ratio feedback control is performed on the basis of a deviation between the actual air-fuel ratio and the stoichiometric air-fuel ratio, which is a target air-fuel ratio, or in other words, the air-fuel ratio deviation (see Japanese Patent No. 5851569, for example).

In motorcycles in particular, there is no linear air-fuel ratio sensor for motorcycles that linearly measures an actual air-fuel ratio of exhaust gas. For this reason, it is necessary to perform air-fuel ratio feedback control on the basis of an air-fuel ratio deviation such as that as described above.

Meanwhile, the following is thought to be the reason why air-fuel ratio feedback control using an oxygen sensor is not applicable to regions outside of the stoichiometric air-fuel ratio. Conventionally, an object of an oxygen sensor is to measure the vicinity of the stoichiometric air-fuel ratio. Accordingly, although the output of an oxygen sensor changes abruptly in the vicinity of the stoichiometric air-fuel ratio, variation in the oxygen output relative to change in the air-fuel ratio decreases further away from the vicinity of the stoichiometric air-fuel ratio. As a result, an air-fuel ratio detection result may differ significantly due to even slight variations in the output voltage of the oxygen sensor.

Temperature characteristics of an oxygen sensor are cited as the main cause of variations in an output voltage of the oxygen sensor. When the temperature of an oxygen sensor changes, oxygen sensor output voltages outside of the stoichiometric air-fuel ratio change due to the temperature characteristics of the oxygen sensor. Due to this, it is difficult to accurately measure air-fuel ratios outside of the stoichiometric air-fuel ratio.

In order to take into consideration the temperature characteristics of an oxygen sensor, it is necessary to detect the temperature of the oxygen sensor. Normally, however, oxygen sensors are not equipped with a sensor for detecting temperature.

Estimating sensor temperature on the basis of an engine rotation speed and a throttle opening degree has been conceived as a method of taking into consideration the temperature of an oxygen sensor (see Japanese Patent No. 4607163, for example). According to Japanese Patent No. 4607163, a feature has been conceived in which the value of an air-fuel ratio converted from an oxygen sensor output voltage (hereinafter referred to as a measured air-fuel ratio) is corrected on the basis of an estimated oxygen sensor temperature.

This method takes into consideration the fact that exhaust temperature changes according to the operating region of an engine, and that a sensor temperature changes as a result thereof.

SUMMARY OF THE INVENTION

However, the following problems exist in the prior art.

In order to correct a measured air-fuel ratio on the basis of an estimated oxygen sensor temperature as in Japanese Patent No. 4607163, it is necessary to have a correction coefficient so that a measured air-fuel ratio is adjusted to the actual air-fuel ratio. However, the relationship between the oxygen sensor output voltage and the air-fuel ratio is not linear. For this reason, the process of determining a correction coefficient may become complicated.

For example, it is conceivable to determine a correction coefficient using map data obtained from a measured air-fuel ratio and an oxygen sensor temperature estimated value. However, with this map data, a correction coefficient changes significantly in accordance with the measured air-fuel ratio. For this reason, even a slight error in the measured air-fuel ratio or the oxygen sensor temperature estimated value results in a significant change in a corrected air-fuel ratio. As a result, when air-fuel ratio feedback control is performed using the corrected air-fuel ratio, convergence to a target air-fuel ratio may be delayed or oscillation of feedback control may occur.

Moreover, the actual air-fuel ratio changes from moment to moment. For this reason, when a correction coefficient is calculated in accordance with a measured air-fuel ratio, a calculation delay occurs such that it may be difficult to match the measured air-fuel ratio with the actual air-fuel ratio.

Moreover, in order to estimate an oxygen sensor temperature, it is necessary to measure the oxygen sensor temperature in various operating states and keep these measurements as data. Further, in order to measure the oxygen sensor temperature, it is necessary to retrofit a test vehicle with a temperature sensor for measuring the oxygen sensor temperature. Preparing, for this purpose, such a sensor to be retrofitted every time a development vehicle changes is extremely labour intensive and practically difficult.

Moreover, there is also a delay in a change in the oxygen sensor temperature being reflected in the oxygen sensor output voltage. For this reason, additional control for correcting this delay may also become necessary, with the result that the air-fuel ratio feedback control process may become complicated.

Further, when a deviation in an oxygen sensor temperature estimated value or a deviation in a corrected air-fuel ratio cannot be tolerated, loss may occur as a result of re-setting each piece of data and/or the air-fuel ratio feedback control process may become complicated due to the addition of control.

In view of the problems described above, an object of the present invention is to obtain an engine control device and an engine control method in which output characteristics of an oxygen sensor are corrected and air-fuel ratio feedback control is performed without having to estimate an oxygen sensor temperature.

An engine control device according to the present invention is an engine control device provided with: various sensors to detect operating state information of an engine, the operating state information including an engine temperature, an engine rotation speed, and a throttle opening degree; an oxygen sensor, the output voltage value of which changes in response to a concentration of oxygen in exhaust gas of the engine; and air-fuel ratio feedback controller to adjust an amount of fuel injected into the engine, on the basis of the operating state information and the output voltage value, wherein the air-fuel ratio feedback controller calculates, in accordance with the operating state information based on detection results from the various sensors, an oxygen sensor output voltage correction coefficient, which is a coefficient for correcting the output voltage value, implements air-fuel ratio feedback control on the basis of an air-fuel ratio feedback control correction amount calculated using a corrected oxygen sensor output voltage value calculated on the basis of the oxygen sensor output voltage correction coefficient, and adjusts the amount of fuel injected into the engine.

Further, an engine control method according to the present invention is an engine control method executed by air-fuel ratio feedback controller in an engine control device provided with: various sensors to detect operating state information of an engine, the operating state information including an engine temperature, an engine rotation speed, and a throttle opening degree; an oxygen sensor, the output voltage value of which changes in response to a concentration of oxygen in exhaust gas of the engine; and the air-fuel ratio feedback controller to adjust an amount of fuel injected into the engine, on the basis of the operating state information and the output voltage value, the engine control method including a first step of calculating, in accordance with the operating state information based on detection results from the various sensors, an oxygen sensor output voltage correction coefficient, which is a coefficient for correcting the output voltage value, a second step of calculating an air-fuel ratio feedback control correction amount using a corrected oxygen sensor output voltage value calculated on the basis of the oxygen sensor output voltage correction coefficient, and a third step of implementing air-fuel ratio feedback control on the basis of the air-fuel ratio feedback control correction amount and adjusting the amount of fuel injected into the engine.

With the present invention, a configuration is provided in which an oxygen sensor output voltage, which changes in accordance with an operating state of a vehicle, is corrected and air-fuel ratio feedback control is performed without having to directly estimate and determine an oxygen sensor temperature. As a result, an engine control device and an engine control method can be obtained in which output characteristics of the oxygen sensor are corrected and air-fuel ratio feedback control is performed without having to estimate an oxygen sensor temperature.

BRIEF DESCRIPTION OF THE DRAWINGS

FIG. 5 is a diagram showing a change in an oxygen sensor temperature when an actual air-fuel ratio is switched according to the first embodiment of the present invention;

FIG. 7 is a flowchart showing operations of the air-fuel ratio feedback control means according to the first embodiment of the present invention.

DESCRIPTION OF THE PREFERRED EMBODIMENTS

Preferred embodiments of an engine control device and an engine control method according to the present invention will be described hereinafter with reference to the drawings.

First Embodiment

Figure 1:
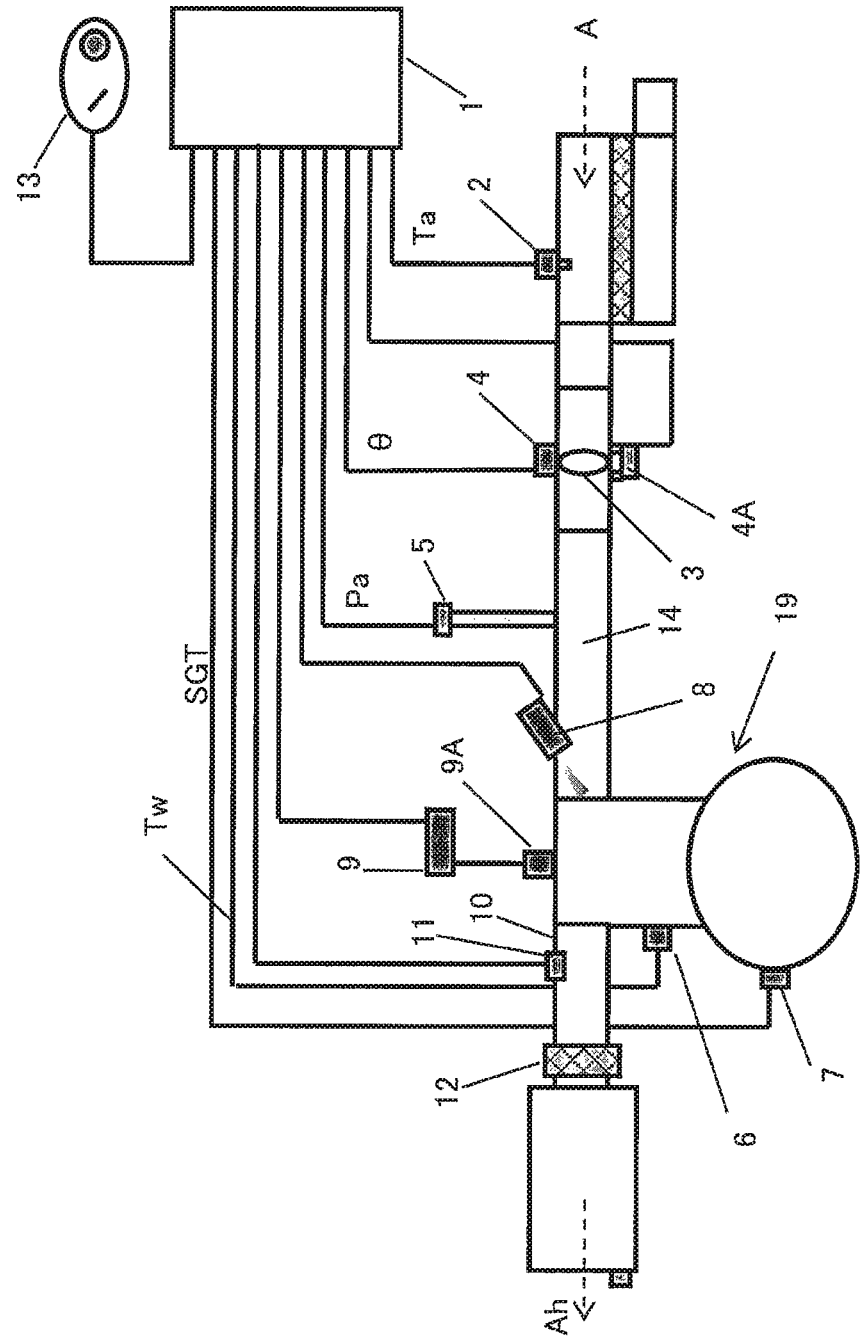
FIG. 1 is a configuration diagram showing a state in which an engine control device according to a first embodiment of the present invention is attached to an engine.

FIG. 1 is a configuration diagram showing a state in which an engine control device according to a first embodiment of the present invention is attached to an engine. In FIG. 1, a control unit 1 is constituted by a microcomputer which includes a CPU and a memory and constitutes a main part of the engine control device. The control unit 1 stores programs and map data for controlling the operation of an entire engine 19.

An intake pipe 14 for introducing intake air A into the engine 19 is provided with an intake air temperature sensor 2, a throttle valve 3, a throttle position sensor 4, an intake air pressure sensor 5, and a fuel injection module 8.

Here, the intake air temperature sensor 2 is a sensor for measuring a temperature (intake air temperature) Ta of the intake air A which flows into the engine 19. The throttle valve 3 is a valve that is driven to open and close by a throttle actuator 4A. The throttle position sensor 4 is a sensor for measuring an opening degree θ of the throttle valve 3. The intake air pressure sensor 5 is a sensor for measuring an intake air pressure Pa downstream from the throttle valve 3. Further, the fuel injection module 8 is an injector for injecting fuel.

Further, the engine 19 is provided with an engine temperature sensor 6, a crank angle sensor 7, and a spark plug 9A. Here, the engine temperature sensor 6 is a sensor for measuring a wall surface temperature or a cooling water temperature Tw of the engine 19 (the temperature TW is hereinafter referred to as the engine temperature TW). The crank angle sensor 7 is a sensor for outputting a crank angle signal SGT (pulse) which corresponds to an engine rotation speed Ne and a crank position. Further, the spark plug 9A is a plug driven by an ignition coil 9.

Further, an oxygen sensor 11 and a three-way catalytic converter 12 (hereinafter simply referred to as "the three-way catalyst 12") are provided in an exhaust pipe 10 for exhausting exhaust gas Ah from the engine 19. Here, the oxygen sensor 11 is a sensor that functions as an air-fuel ratio sensor. Further, the three-way catalyst 12 is a three-way catalytic converter for purifying the exhaust gas Ah.

An oxygen sensor output voltage VAF from the oxygen sensor 11 changes in response to a concentration of oxygen in the exhaust gas Ah.

The oxygen sensor 11 is constituted by a configuration in which a platinum electrode is provided on both surfaces of a test tube-shaped zirconia element respectively. Further, the oxygen sensor 11 has a configuration in which an outer side of the platinum electrodes is coated with ceramic in order to protect the platinum electrodes. In other words, the oxygen sensor 11 utilizes a property of the zirconia element, i.e. that an electromotive force is generated when there is a difference in oxygen concentration between the inner surface and the outer surface thereof at a high temperature.

Figure 2:
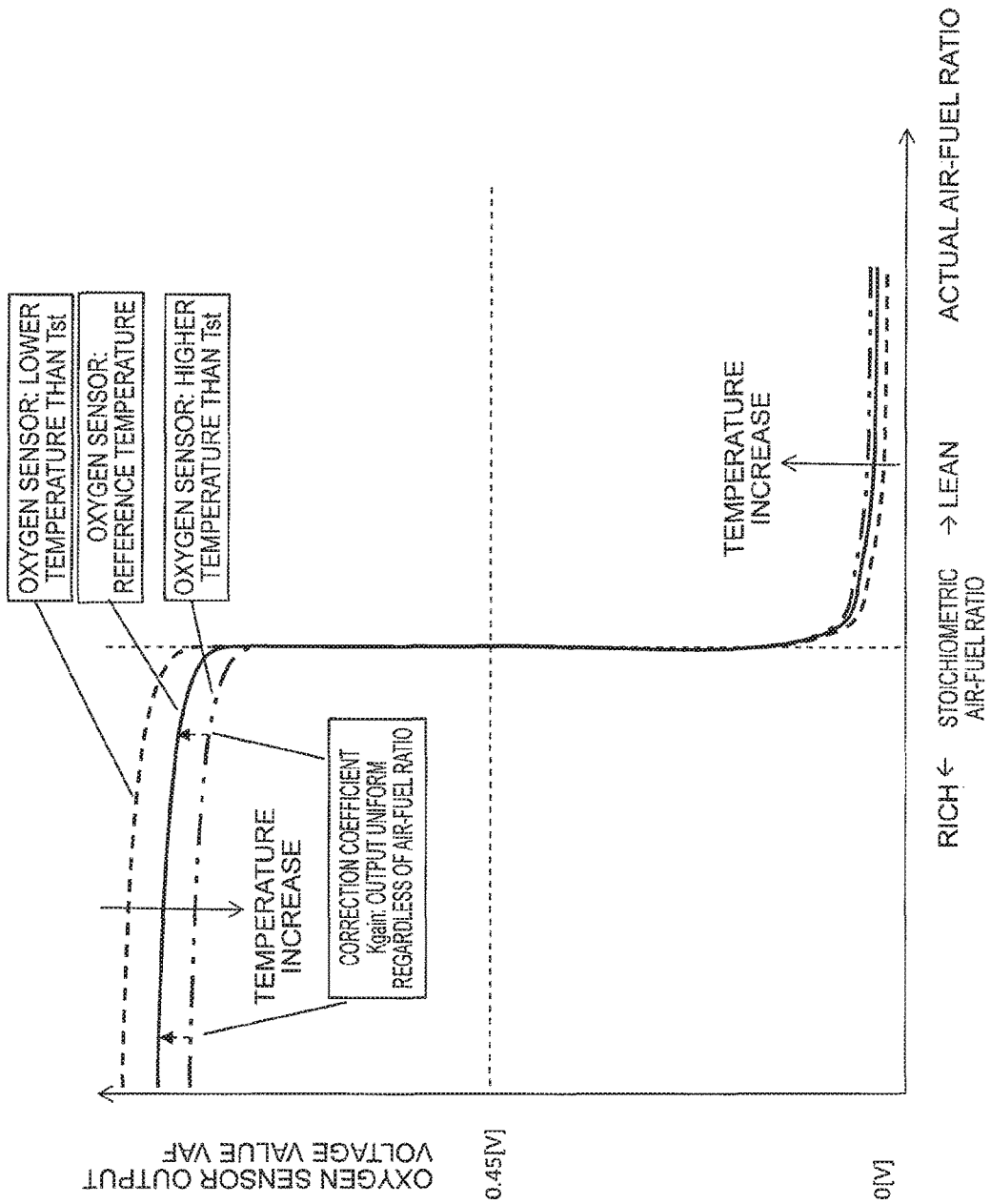
FIG. 2 is an explanatory diagram showing output characteristics of an oxygen sensor used in the first embodiment of the present invention.

FIG. 2 is an explanatory diagram showing output characteristics of the oxygen sensor 11 used in the first embodiment of the present invention. In FIG. 2, the horizontal axis represents the actual air-fuel ratio and the vertical axis represents the oxygen sensor output voltage VAF. Further, in FIG. 2, the solid line represents output characteristics at a reference temperature Tst, the broken line represents output characteristics when the temperature is lower than the reference temperature Tst, and the two-dot chain line represents output characteristics when the temperature is higher than the reference temperature Tst.

The oxygen sensor output voltage VAF [V] changes abruptly with the stoichiometric air-fuel ratio (=14.7) as a boundary. More specifically, the oxygen sensor output voltage VAF [V] has a characteristic in which electromotive force increases on the rich side of the stoichiometric air-fuel ratio and electromotive force decreases on the lean side of the stoichiometric air-fuel ratio. Further, variation in the oxygen sensor output voltage VAF with the stoichiometric air-fuel ratio as a boundary decreases as a sensor element temperature increases.

Detection signals from the oxygen sensor 11 and the various sensors 2 and 4 to 7 are input to the control unit 1 as information indicating the operating state of the engine 19 (operating state information). The control unit 1 outputs drive signals to the various actuators 4, 8, and 9 on the basis of the various operating state information (the intake air temperature Ta, the throttle opening degree θ, the intake air pressure Pa, the engine temperature Tw, the engine rotation speed Ne, the crank angle signal SGT, and the oxygen sensor output voltage VAF).

In addition, the control unit 1 is connected to a display device 13, which serves as a device for communicating a control state, warning information, and the like of the engine 19 to a driver of the vehicle.

The control unit 1 calculates an appropriate timing for fuel to be injected and an appropriate amount of fuel to be injected into the intake pipe 14 on the basis of the operating state, and outputs a drive signal to the fuel injection module 8.

In addition, the control unit 1 calculates an appropriate ignition timing on the basis of the operating state and outputs an ignition signal to the ignition coil 9, whereby a high voltage for spark discharge is applied to the spark plug 9A, causing the mixture in the combustion chamber of the engine 19 to explosively combust.

The exhaust gas Ah from the engine 19 is discharged into the atmosphere from the exhaust pipe 10. The three-way catalyst 12 for exhaust purification is provided in the exhaust pipe 10. The three-way catalyst 12 is a device which is effective at reducing toxic components of the exhaust gas Ah, and the oxidation reaction of HC or CO and the reduction reaction of NOx are performed at the same time.

Figure 3:
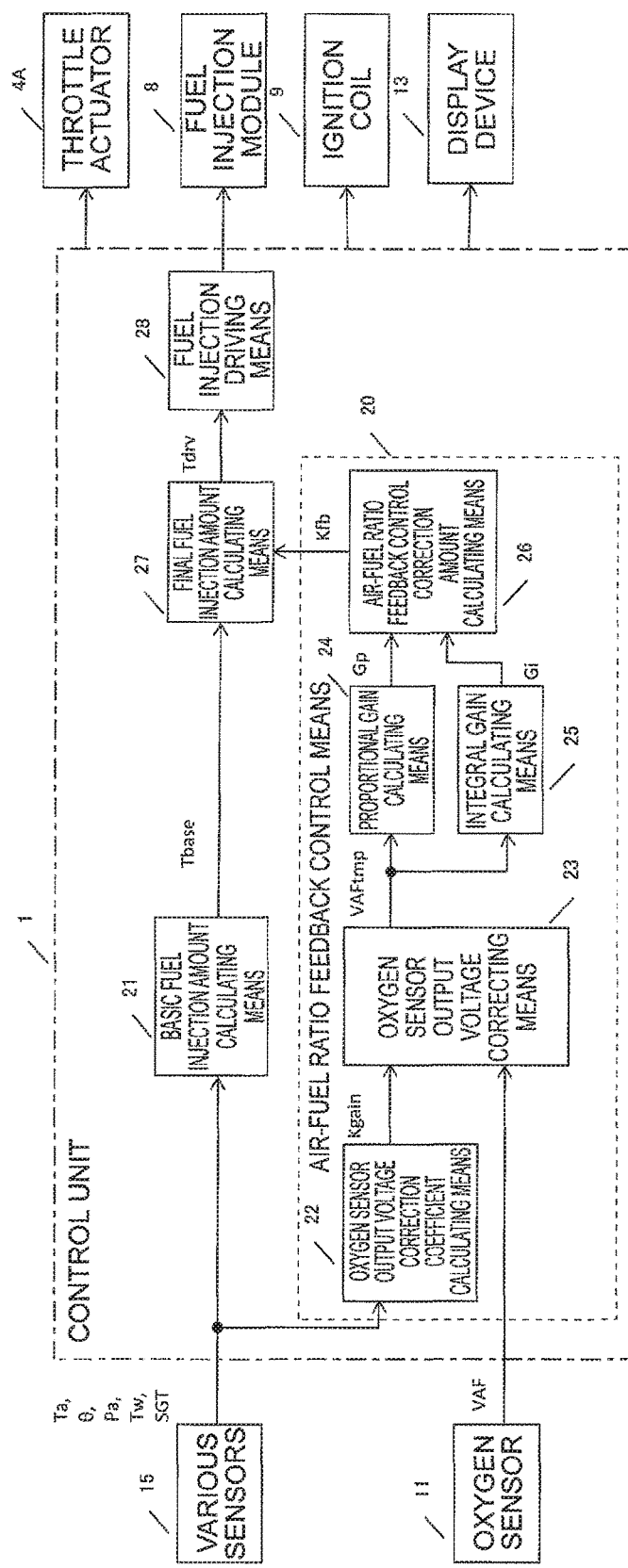
FIG. 3 is a block diagram showing a functional configuration of a control unit in the engine control device according to the first embodiment of the present invention.

FIG. 3 is a block diagram showing a functional configuration of the control unit 1 in the engine control device according to the first embodiment of the present invention. In FIG. 3, the various sensors 15 include the respective sensors 2 and 4 to 7 shown in FIG. 1, and the intake air temperature Ta, the throttle opening degree θ, the intake air pressure Pa, the engine temperature Tw, the engine rotation speed Ne, and the crank angle signal SGT are input to the control unit 1 as operating state information. In the same way, the oxygen sensor 11 inputs the oxygen sensor output voltage VAF to the control unit 1.

In addition to ignition timing control means (not shown), the control unit 1 is provided with air-fuel ratio feedback control means 20 (air-fuel ratio feedback controller 20) linked to fuel injection control means. The control unit 1 adjusts the amount of fuel injected into the engine 19 on the basis of the operating state information from the various sensors 15 and the oxygen sensor output voltage VAF.

The air-fuel ratio feedback control means 20 in the control unit 1 performs air-fuel ratio feedback control using the oxygen sensor output voltage VAF such that the actual air-fuel ratio matches the stoichiometric air-fuel ratio.

The air-fuel ratio feedback control means 20 is provided with correction coefficient calculating means 22 (correction coefficient calculator 22) for calculating a correction coefficient for the oxygen sensor output voltage, output voltage correcting means 23 (output voltage corrector 23) for correcting the oxygen sensor output voltage, proportional gain calculating means 24 (proportional gain calculator 24), integral gain calculating means 25 (integral gain calculator 25), and control correction amount calculating means 26 (control correction amount calculator 26) for calculating a correction amount for air-fuel ratio feedback control.

The correction coefficient calculating means 22 calculates, on the basis of the operating state information from the various sensors and with consideration to temperature characteristics of the oxygen sensor 11, a correction coefficient Kgain for correcting the oxygen sensor output voltage VAF.

The reason why a coefficient is used as a method for correcting the oxygen sensor output voltage VAF will now be explained. By actually PWM duty driving a heater incorporated in the oxygen sensor 11 at a fixed operating state (third gear, 3000 [r/min] engine rotation speed, for example), a temperature change of the oxygen sensor 11 was simulated, and actual air-fuel ratio—oxygen sensor output voltage characteristics were confirmed.

As a result, it was confirmed that a measured actual air-fuel ratio—oxygen sensor output voltage characteristics in a state of being driven at a PWM duty of 100% coincides with measured actual air-fuel ratio—oxygen sensor output voltage characteristics in a state of being driven at a PWM duty of 20% when the latter is multiplied by a coefficient (0.87, for example).

Moreover, it is evident from the equation below (the Nernst equation), which is used to determine the oxygen sensor voltage, that the oxygen sensor temperature and the oxygen sensor output voltage are proportional to each other.

$$E = \frac{RT}{4F} \ln \frac{Pa}{Pb}$$

E: oxygen sensor voltage
R: gas constant
T: absolute temperature
F: Faraday constant
Pa and Pb: partial pressure of oxygen acting on either end of the oxygen sensor As a result of such confirmation, a coefficient is used as a method for correcting the oxygen sensor output voltage VAF.

Figure 4:
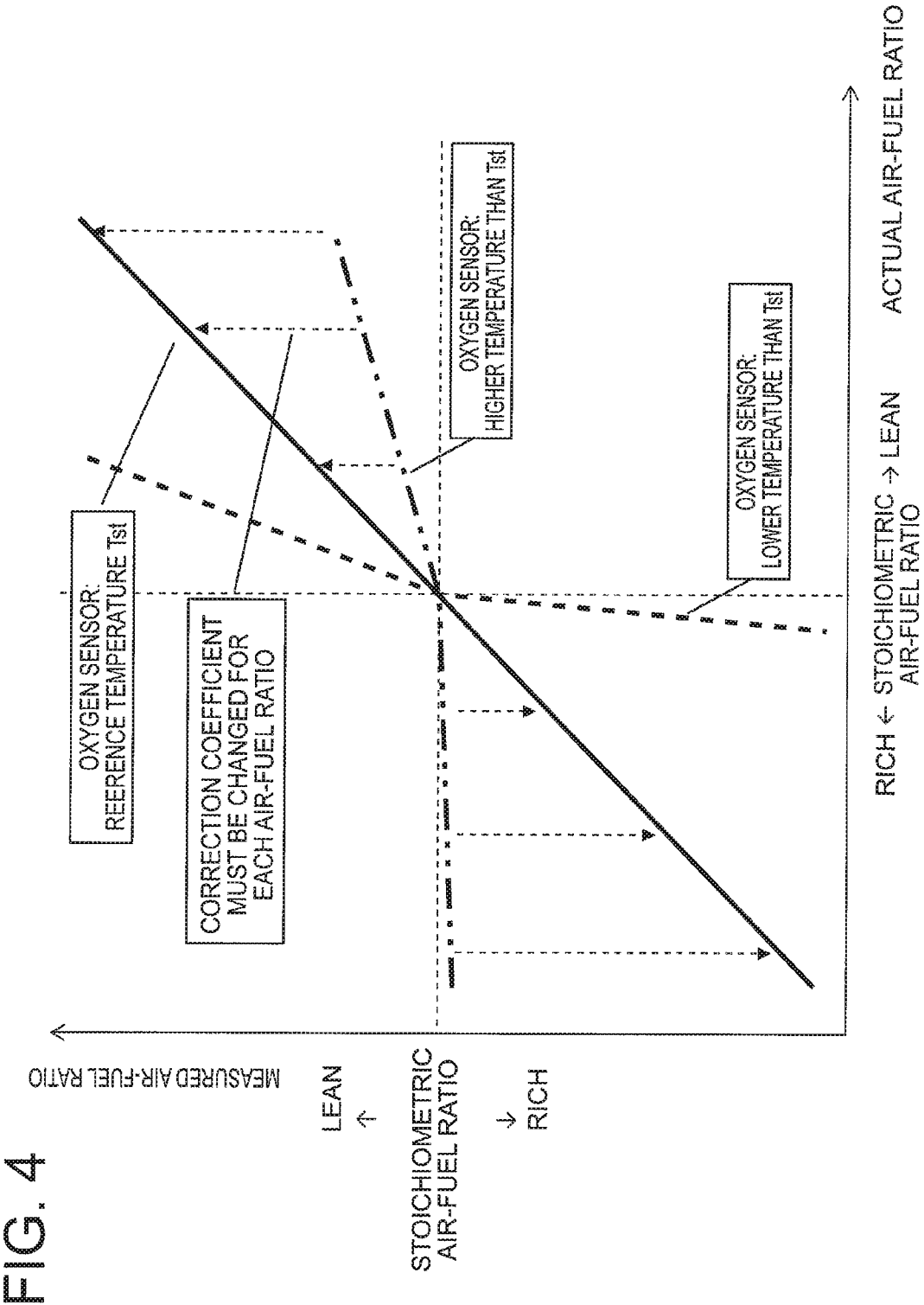
FIG. 4 is an explanatory diagram showing characteristics obtained when an output voltage of the oxygen sensor used in the first embodiment of the present invention is replaced by an air-fuel ratio.

Meanwhile, a case in which a measured air-fuel ratio obtained by replacing an oxygen sensor output voltage with an air-fuel ratio is corrected using the oxygen sensor temperature will be explained with reference to FIG. 4. FIG. 4 is an explanatory diagram showing characteristics obtained when the output voltage of the oxygen sensor used in the first embodiment of the present invention is replaced by an air-fuel ratio. In FIG. 4, the horizontal axis represents the actual air-fuel ratio and the vertical axis represents a measured air-fuel ratio.

When air-fuel ratio is measured using the oxygen sensor 11 at a reference temperature Tst, the actual air-fuel ratio matches the measured air-fuel ratio. However, when the air-fuel ratio is measured using the oxygen sensor 11 at a higher temperature than the reference temperature Tst, a change in the measured air-fuel ratio decreases to less than when measurement is conducted at the reference temperature Tst, as shown in FIG. 4.

In order to match the measured air-fuel ratio at a high temperature with the measured air-fuel ratio at the reference temperature Tst, it is necessary to multiply each measured air-fuel ratio by a different coefficient, thereby performing correction. Accordingly, when correcting a measured air-fuel ratio with consideration to the temperature characteristics of the oxygen sensor 11, it is necessary to perform correction in accordance with the oxygen sensor temperature and the measured air-fuel ratio. As a result, the air-fuel ratio feedback control process may become complicated.

In view of such a problem, the special technical feature of the present invention is to calculate correction coefficients for the oxygen sensor output voltage with a focus on operating states in which a temperature change of the oxygen sensor is large. Therefore, some specific examples of vehicle operating states have been selected and are described below.

Whether or not a vehicle is in a state immediately after engine start-up was focused on as a first vehicle operating state. Directly before engine start-up, the ambient temperature of the engine is normal temperature. For this reason, it can be thought that the temperature of the oxygen sensor 11 is also low and, after engine start-up, the oxygen sensor temperature increases due to the influence of the exhaust temperature.

Whether or not the vehicle is accelerating/decelerating was focused on as a second vehicle operating state. The reason for correcting the oxygen sensor voltage with a focus on acceleration/deceleration of the vehicle is as follows. It was found that there was a difference (about 100° C.) in the oxygen sensor temperature between when the vehicle was run at a fixed operating state (third gear, 3000 [r/min] engine rotation speed, for example) and when the vehicle was repeatedly accelerated/decelerated.

Whether or not fuel cut is in progress was focused on as a third vehicle operating state. While fuel cut is in progress, there is no combustion occurring inside the engine. For this reason, the exhaust temperature decreases such that the temperature of the oxygen sensor 11 also decreases. Once fuel cut has been terminated, on the other hand, it can be thought that the exhaust temperature rises and the oxygen sensor temperature also rises due to the influence of the exhaust temperature.

A state in which the air-fuel ratio is rich or lean was focused on as a fourth vehicle operating state. The reason for correcting the oxygen sensor voltage with a focus on a state in which the air-fuel ratio is rich or lean is as follows. FIG. 5 is a diagram showing a change in the oxygen sensor temperature when the actual air-fuel ratio is switched according to the first embodiment of the present invention. As shown in FIG. 5, it was found that there was a difference in the oxygen sensor temperature between when the vehicle was actually run at a fixed operating state (third gear, 3000 [r/min] engine rotation speed, for example) with 14.7 as the actual air-fuel ratio, and at the fixed operating state with 13 as the actual air-fuel ratio.

Note that here, correction of the oxygen sensor output voltage was examined with a focus on operating states in which the temperature change of the oxygen sensor 11 is large. As a coefficient is used to correct the oxygen sensor output voltage, however, the output voltage can be corrected not only when temperature change is large, but also when temperature change is small.

The output voltage correcting means 23 calculates a corrected oxygen sensor output voltage VAFtmp using the oxygen sensor output voltage VAF and an oxygen sensor output voltage correction coefficient Kgain.

As shown in FIG. 2, it is evident that the corrected oxygen sensor output voltage VAFtmp is calculated by multiplying the oxygen sensor output voltage VAF by the oxygen sensor output voltage correction coefficient Kgain, whereby the oxygen sensor output voltage VAF can be matched with the oxygen sensor output voltage VAF at the reference temperature Tst.

The proportional gain calculating means 24 calculates a proportional gain Gp, which corresponds to the proportional term of the air-fuel ratio feedback control, on the basis of the corrected oxygen sensor output voltage VAFtmp.

Note that here, a case is described in which a method is adopted in which the proportional gain Gp, which corresponds to the proportional term of the air-fuel ratio feedback control, is calculated on the basis of the corrected oxygen sensor output voltage VAFtmp. However, a method other than this method, for example a method in which the actual air-fuel ratio is calculated from the corrected oxygen sensor output voltage VAFtmp and the proportional gain Gp is calculated from the air-fuel ratio deviation, which is the difference between the actual air-fuel ratio and the target air-fuel ratio, can also be adopted.

The integral gain calculating means 25 calculates the integral gain Gi, which corresponds to the integral term of the air-fuel ratio feedback control, on the basis of the corrected oxygen sensor output voltage VAFtmp.

Note that, here, a case is described in which a method is adopted in which the integral gain Gi, which corresponds to the integral term of the air-fuel ratio feedback control, is calculated on the basis of the corrected oxygen sensor output voltage VAFtmp. However, a method other than this method, for example a method in which the actual air-fuel ratio is calculated from the corrected oxygen sensor output voltage VAFtmp and the integral gain Gi is calculated from the air-fuel ratio deviation, which is the difference between the actual air-fuel ratio and the target air-fuel ratio, can also be adopted.

The air-fuel ratio feedback control correction amount calculating means 26 determines an air-fuel ratio feedback control correction amount Kfb on the basis of the proportional gain Gp and the integral gain Gi.

Moreover, in addition to the air-fuel ratio feedback control means 20, the control unit 1 is provided with basic fuel injection amount calculating means 21 (basic fuel injection amount calculator 21), final fuel injection amount calculating means 27 (final fuel injection amount calculator 27), and fuel injection driving means 28 (fuel injection driver 28). The basic fuel injection amount calculating means 21 is calculating means for determining a basic fuel injection amount Tbase on the basis of information from the various sensors.

The basic fuel injection amount calculating means 21 calculates a fuel injection amount that is determined in accordance with an operating region based on the engine rotation speed Ne, which is based on the crank angle signal SGT, and the throttle opening degree θ from the throttle position sensor 4. Alternatively, the basic fuel injection amount calculating means 21 calculates a fuel injection amount that is determined in accordance with an operating region based on the engine rotation speed Ne and the intake air pressure Pa from the intake air pressure sensor 5.

Further, the basic fuel injection amount calculating means 21 executes a fuel injection amount correction using the intake air temperature Ta from the intake air temperature sensor 2, a fuel injection amount correction using the engine temperature Tw from the engine temperature sensor 6, and a fuel injection amount correction in accordance with various operating conditions, and determines the basic fuel injection amount Tbase.

The final fuel injection amount calculating means 27 is calculating means for determining a final fuel injection amount Tdrv from the basic fuel injection amount Tbase and the air-fuel ratio feedback control correction amount Kfb. More specifically, the final fuel injection amount calculating means 27 corrects the basic fuel injection amount Tbase using the air-fuel ratio feedback control correction amount Kfb, and calculates the final fuel injection amount Tdrv. Further, the fuel injection driving means 28 drives the fuel injection module 8 using the final fuel injection amount Tdrv.

Next, how the oxygen sensor voltage correction coefficient is determined will be explicitly described with reference to FIGS. 6A to 6F. FIGS. 6A to 6F are drawings which explain transition states of engine rotation speed, oxygen sensor temperature, oxygen sensor output voltage, air-fuel ratio feedback correction amount, and actual air-fuel ratio when an oxygen sensor output voltage correction coefficient is adjusted in the first embodiment of the present invention.

Figure 6A:
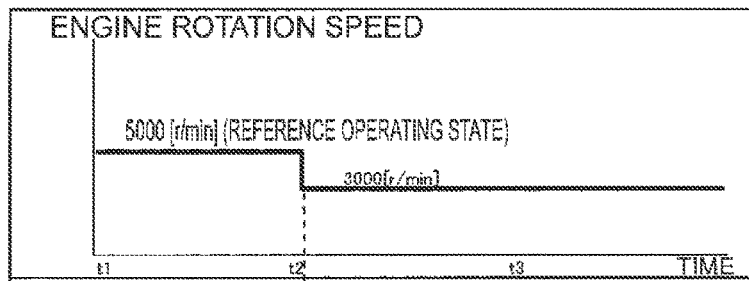
FIGS. 6A, 6B, 6C, 6D, 6E and 6F are drawings which explain transition states of engine rotation speed, oxygen sensor temperature, oxygen sensor output voltage, air-fuel ratio feedback correction amount, and actual air-fuel ratio when an oxygen sensor output voltage correction coefficient is adjusted in the first embodiment of the present invention.
Figure 6B:
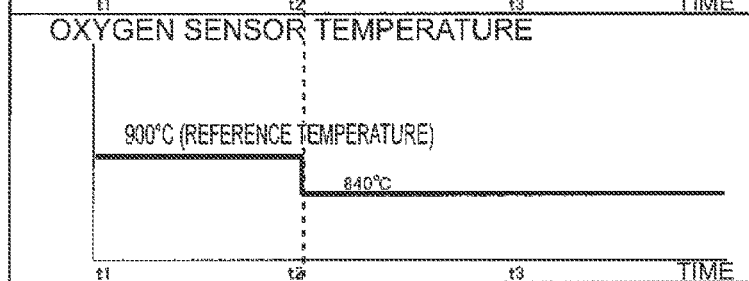
Figure 6C:
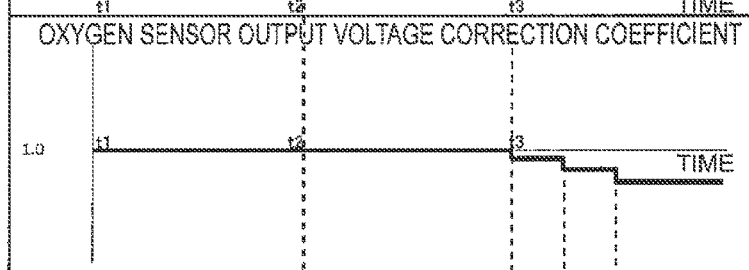
Figure 6D:
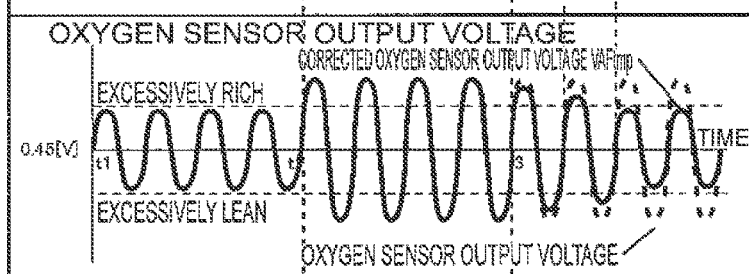
Figure 6E:
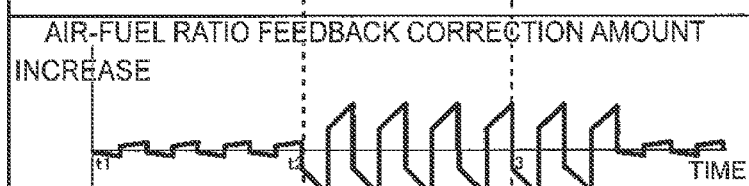
Figure 6F:
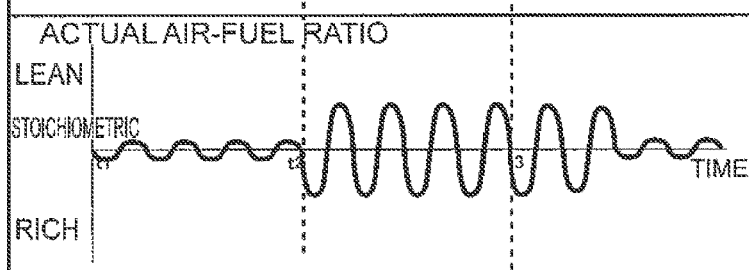

The horizontal axes of FIGS. 6A, 6B, 6C, 6D, 6E and 6F represent time. The vertical axis of FIG. 6A represents engine rotation speed, the vertical axis of FIG. 6B represents oxygen sensor temperature, the vertical axis of FIG. 6C represents oxygen sensor output voltage correction coefficient, the vertical axis of FIG. 6D represents oxygen sensor output voltage, the vertical axis of FIG. 6E represents air-fuel ratio feedback correction amount, and the vertical axis of FIG. 6F represents actual air-fuel ratio.

Note that, normally, when determining an air-fuel ratio feedback correction amount, the actual air-fuel ratio is measured by attaching a retrofitted linear air-fuel ratio sensor to the test vehicle.

First, at a time t1, air-fuel ratio feedback control is implemented in a fixed operating state (third gear, 5000 [r/min] engine rotation speed, for example), as shown in FIG. 6A. Note that this operating state is set as a reference operating state, and the temperature of the oxygen sensor is set as a reference temperature.

In such a reference operating state, a proportional gain and an integral gain are determined so that the actual air-fuel ratio rapidly converges on the stoichiometric air-fuel ratio as shown in FIG. 6F, and the air-fuel ratio feedback correction amount is determined, as shown in FIG. 6E.

Next, at a time t2, air-fuel ratio feedback control is performed at a different operating state (third gear, 3000 [r/min] engine rotation speed, for example), as shown in FIG. 6A, and behaviour in which the actual air-fuel ratio converges on the stoichiometric air-fuel ratio is confirmed.

At this time, as shown in FIG. 6B, the temperature of the oxygen sensor decreases, such that an amplitude of the oxygen sensor output voltage increases, as shown in FIG. 6D. When the amplitude of the oxygen sensor output voltage increases, the actual air-fuel ratio is misinterpreted as being excessively lean or excessively rich. For this reason, the gain for making rich and the gain for making lean of the proportional gain and the integral gain respectively increase, such that the amplitude of the air-fuel ratio feedback correction amount also increases. As a result, the amplitude of the actual air-fuel ratio also increases, as shown in FIG. 6F.

Next, at a time t3, while observing the behaviour of the actual air-fuel ratio in FIG. 6F, the oxygen sensor output voltage correction coefficient is adjusted, as shown in FIG. 6C. As a result, the amplitude of the actual air-fuel ratio can be made equivalent to the behaviour demonstrated in the reference operating state, as shown in FIG. 6F.

Figure 8:
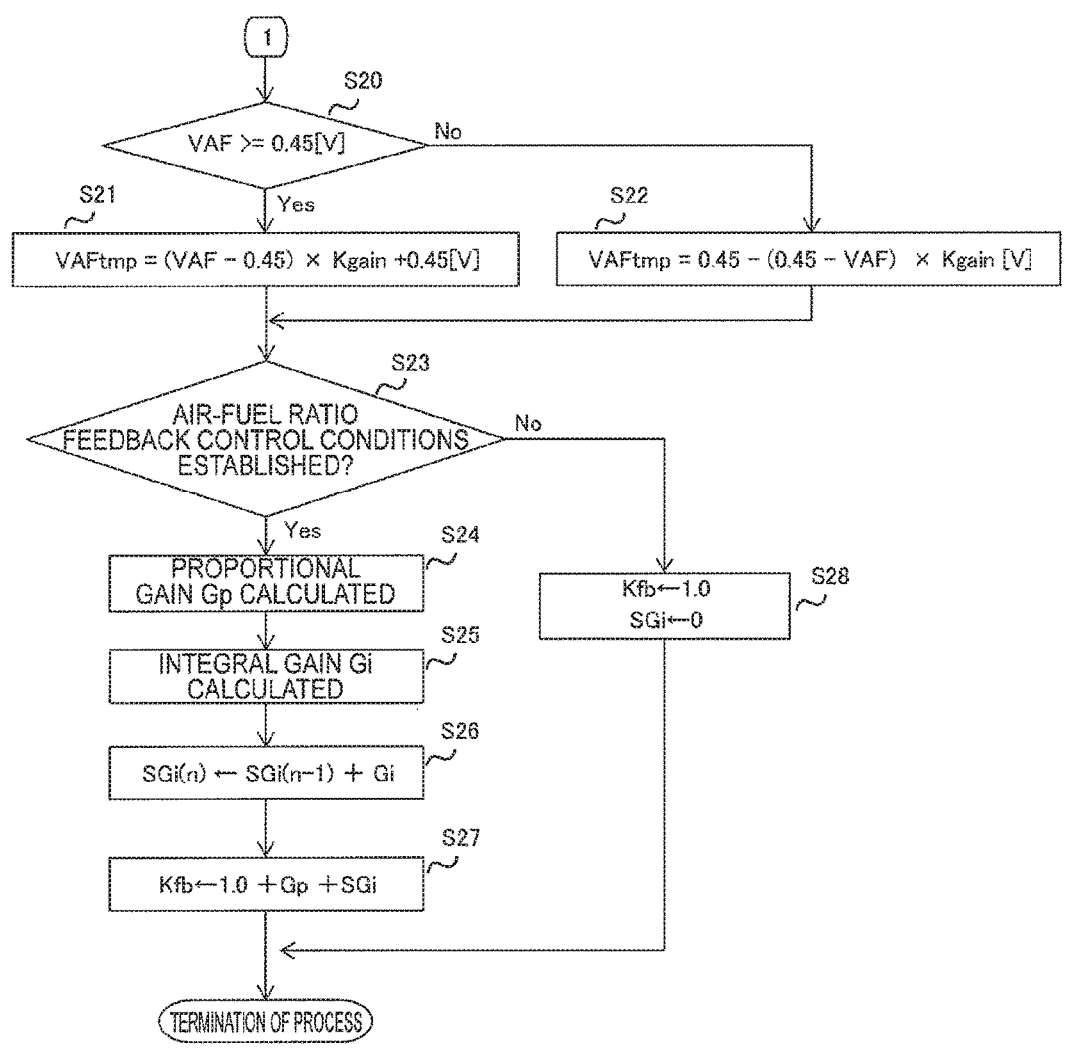
FIG. 8 is a flowchart showing operations of the air-fuel ratio feedback control means according to the first embodiment of the present invention.

The operation of the air-fuel ratio feedback control means 20 will be described hereinafter in detail with reference to the flowcharts, in addition to FIG. 1 to FIGS. 6A to 6F. FIG. 7 and FIG. 8 are flow charts showing operations of the air-fuel ratio feedback control means according to the first embodiment of the present invention. Note that the process shown in FIG. 7 and FIG. 8 is performed for every predetermined control cycle or in synchronization with the crank angle signal SGT.

In FIG. 7, the air-fuel ratio feedback control means 20 first, in step S1, reads the signal of each sensor, which respectively indicate the operating state of the engine 19. In other words, the air-fuel ratio feedback control means 20 reads output signals (the engine rotation speed Ne, etc. calculated from the crank angle signal SGT) from the various sensors 15 (the intake air temperature sensor 2, the throttle position sensor 4, the intake air pressure sensor 5, the engine temperature sensor 6, and the crank angle sensor 7) and the oxygen sensor 11.

Next, in step S2, the air-fuel ratio feedback control means 20 determines whether or not a fixed time period has elapsed since activation of the oxygen sensor 11 on the basis of the oxygen sensor output voltage VAF. Then, if it is determined that the fixed time period has not elapsed since activation of the oxygen sensor 11, the process proceeds to step S3.

The following can be considered as the method for determining whether or not the oxygen sensor 11 has been activated. When a fixed time period has elapsed in a state in which the oxygen sensor output voltage is within a predetermined voltage range, it can be determined that the oxygen sensor 11 has been activated. Further, when the oxygen sensor 11 is equipped with a heater, it may also be determined that the oxygen sensor 11 has been activated when a predetermined time period has elapsed while the heater is being driven. Alternatively, whether or not the oxygen sensor 11 has been activated may also be determined by combining the state of the oxygen sensor voltage and the drive state of the heater.

When the process proceeds to step S3, the air-fuel ratio feedback control means 20 sets a correction coefficient in preparation for when air-fuel ratio feedback control is performed after activation of the oxygen sensor 11. More specifically, the air-fuel ratio feedback control means 20 substitutes a correction coefficient Kgain_act for when the oxygen sensor is activated as an oxygen sensor output voltage correction coefficient Kgain_1st for when air-fuel ratio feedback is commenced, and the process proceeds to step S9.

However, if it is determined in step S2 that a fixed time period has elapsed since activation of the oxygen sensor 11, the process proceeds to step S4.

Then, in step S4, the air-fuel ratio feedback control means 20 determines whether or not both of the following conditions 1 and 2 have been established from the operating state of the engine.
[Condition 1] Whether or not it is the first time that air-fuel ratio feedback control conditions have been established.
[Condition 2] Whether or not a lean state has continued for a fixed time period prior to the establishment of air-fuel ratio feedback control conditions.

When the air-fuel ratio feedback control means 20 determines that both condition 1 and condition 2 have been established, the process proceeds to step S5. Then, in step S5, the air-fuel ratio feedback control means 20 sets a correction coefficient in preparation for change in the oxygen sensor temperature by keeping the air-fuel ratio in a lean state for a fixed time period prior to air-fuel ratio feedback control. More specifically, the air-fuel ratio feedback control means 20 substitutes a correction coefficient Kgain_lean for a continuous lean state as the oxygen sensor output voltage correction coefficient Kgain_1st for when air-fuel ratio feedback is commenced, and the process proceeds to step S9.

However, if it is determined in step S4 that at least one of condition 1 or condition 2 has not been established, the process proceeds to step S6.

Then, in step S6, the air-fuel ratio feedback control means 20 determines whether or not both of the following conditions 1 and 3 have been established from the operating state of the engine.
[Condition 1] Whether or not it is the first time that air-fuel ratio feedback control conditions have been established.
[Condition 3] Whether or not a rich state has continued for a fixed time period prior to the establishment of air-fuel ratio feedback control conditions.

When the air-fuel ratio feedback control means 20 determines that both condition 1 and condition 3 have been established, the process proceeds to step S7. Then, in step S7, the air-fuel ratio feedback control means 20 sets a correction coefficient in preparation for change in the oxygen sensor temperature by keeping the air-fuel ratio in a rich state for a fixed time period prior to air-fuel ratio feedback control. More specifically, the air-fuel ratio feedback control means 20 substitutes a correction coefficient Kgain_rich for a continuous rich state as the oxygen sensor output voltage correction coefficient Kgain_1st for when air-fuel ratio feedback is commenced, and the process proceeds to step S9.

However, if it is determined in step S6 that at least one of condition 1 or condition 3 has not been established, the process proceeds to step S8.

Then, in step S8, the air-fuel ratio feedback control means 20 sets a correction coefficient with consideration to the fact that the temperature of the oxygen sensor saturates over time. More specifically, the air-fuel ratio feedback control means 20 gradually decreases or gradually increases the oxygen sensor output voltage correction coefficient Kgain_1st for when air-fuel ratio feedback is commenced to 1.0, and the process proceeds to step S9.

When the process proceeds to step S9, the air-fuel ratio feedback control means 20 determines whether or not an engine temperature from the engine temperature sensor is lower than a fixed value. Then, if it is determined that the engine temperature is lower than the fixed value, the process proceeds to step S10.

Then, in step S10, the air-fuel ratio feedback control means 20 sets a correction coefficient with consideration to the fact that, due to the engine temperature being low, the exhaust temperature is low and the oxygen sensor temperature decreases. More specifically, the air-fuel ratio feedback control means 20 substitutes a correction coefficient Kgain_et for when engine temperature is low as a target oxygen sensor output voltage correction coefficient Kgain_tgt, and the process proceeds to step S16.

Here, the correction coefficient Kgain_et for when engine temperature is low may also be determined by map data obtained in accordance with the engine temperature.

However, if it is determined in step S9 that the engine temperature from the engine temperature sensor is higher than the fixed value, the process proceeds to step S11.

Then, in step S11, the air-fuel ratio feedback control means 20 determines whether or not a variation in the engine rotation speed is smaller than a predetermined determination value. When it is determined that the variation in the engine rotation speed is smaller than the determination value, the process proceeds to step S12.

Then, in step S12, the air-fuel ratio feedback control means 20 sets a correction coefficient with consideration to the fact that the vehicle is running steadily due to the variation in the engine rotation speed being small. More specifically, the air-fuel ratio feedback control means 20 substitutes a correction coefficient Kgain_const for steady running as the target oxygen sensor output voltage correction coefficient Kgain_tgt, and the process proceeds to step S16.

Here, the correction coefficient Kgain_const for steady running may also be determined by map data obtained in accordance with the intake air amount and the engine rotation speed, with consideration to the fact that the exhaust temperature changes according to the operating region. Note that the intake air amount can be determined from the throttle opening degree or the intake air pressure, which are acquired as operating state information.

However, if it is determined in step S11 that the variation in the engine rotation speed is equal to or greater than the determination value, the process proceeds to step S13.

Then, in step S13, the air-fuel ratio feedback control means 20 determines whether or not fuel cut is in progress. If it is determined that fuel cut is in progress, the process proceeds to step S14.

Then, in step S14, fuel cut is in progress, so the air-fuel ratio feedback control means 20 sets a correction coefficient with consideration to the fact that, while fuel cut is in progress, the exhaust temperature decreases, whereby the oxygen sensor temperature also decreases. More specifically, the air-fuel ratio feedback control means 20 substitutes a correction coefficient Kgain_fc for when fuel cut is in progress as the target oxygen sensor output voltage correction coefficient Kgain_tgt, and the process proceeds to step S16.

Here, the correction coefficient Kgain_fc for when fuel cut is in progress may also be determined in accordance with the fuel cut time period.

However, if it is determined in step S13 that fuel cut is not in progress, the process proceeds to step S15.

Then, in step S15, as fuel cut is not in progress, and the variation in the engine rotation speed is equal to or greater than the determination value, the air-fuel ratio feedback control means 20 sets a correction coefficient with consideration to the fact that the oxygen sensor temperature changes in a transient state. More specifically, the air-fuel ratio feedback control means 20 substitutes a correction coefficient Kgain_acc for when engine rotation fluctuates as the target oxygen sensor output voltage correction coefficient Kgain_tgt, and the process proceeds to step S16.

Here, the correction coefficient Kgain_acc for when engine rotation fluctuates may also be determined by map data obtained in accordance with the variation in the engine rotation speed.

Note that, here, Kgain_tgt is determined by switching between Kgain_et, Kgain_const, Kgain_fc, and Kgain_acc in accordance with the operating state, however, the method of determining Kgain_tgt is not limited to this method. As an example of a different method thereto, the target oxygen sensor voltage correction coefficient Kgain_tgt may also be determined by first substituting Kgain_const as Kgain_tgt, after which, when it is determined that the engine temperature is lower than the fixed value, $$Kgain\_tgt = Kgain\_tgt \times Kgain\_et$$

is calculated, then, when it is determined that a variation in the engine rotation speed is equal to or greater than the determination value, $$Kgain\_tgt = Kgain\_tgt \times Kgain\_acc$$

is calculated and, finally, when it is determined that fuel cut is in progress, $$Kgain\_tgt = Kgain\_tgt \times Kgain\_fc$$

is calculated.

When the process proceeds to step S16, the air-fuel ratio feedback control means 20 determines whether the engine is not in a stall mode, that is, the engine is not in a stopped state, and also whether the engine is not in a start-up mode, that is, the engine is not starting up. If it is determined that the engine is neither in the stall mode nor in the start-up mode, the process proceeds to step S17.

Then, in step S17, as the engine is neither in the stall mode nor in the start-up mode, the air-fuel ratio feedback control means 20 sets a correction coefficient with consideration to the fact that the oxygen sensor temperature changes in accordance with the exhaust temperature which corresponds to the operating state of the engine. More specifically, the air-fuel ratio feedback control means 20 gradually decreases or gradually increases a normal oxygen sensor output voltage correction coefficient Kgain_nml such that the normal oxygen sensor output voltage correction coefficient Kgain_nml becomes the target oxygen sensor output voltage correction coefficient Kgain_tgt, and the process proceeds to step S19.

Note that the speed at which the normal oxygen sensor output voltage correction coefficient Kgain_nml is gradually decreased or gradually increased such that the normal oxygen sensor output voltage correction coefficient Kgain_nml becomes the target oxygen sensor output voltage correction coefficient Kgain_tgt is influenced by the change in the ambient temperature of the oxygen sensor 11, and is dependent on the speed at which the temperature of the oxygen sensor 11 itself changes. The temperature change of the oxygen sensor changes in accordance with the exhaust temperature, the exhaust amount, and the exhaust flow rate. Therefore, the speed at which the normal oxygen sensor output voltage correction coefficient Kgain_nml is gradually decreased or gradually increased may also be determined from map data obtained in accordance with the intake air amount and the engine rotational speed.

However, if it is determined in step S16 that the engine is in the stall mode or the start-up mode, the process proceeds to step S18.

Then, in step S18, as the engine is in the stall mode or the start-up mode, the air-fuel ratio feedback control means 20 sets a temperature coefficient with consideration to the fact that, prior to engine start-up, the sensor temperature decreases due to the ambient temperature of the oxygen sensor being normal temperature and, after engine start-up, the sensor temperature increases due to the exhaust temperature. More specifically, the air-fuel ratio feedback control means 20 substitutes an oxygen sensor output voltage correction coefficient Kgain_start for during engine start-up as the normal oxygen voltage correction coefficient Kgain_nml, and the process proceeds to step S19.

Then, in step S19, the air-fuel ratio feedback control means 20 calculates the oxygen sensor output voltage correction coefficient Kgain as $$Kgain = Kgain\_1st \times Kgain\_nml$$

and the process proceeds to step S20 in FIG. 8.

Then, in step S20, the air-fuel ratio feedback control means 20 determines whether or not the oxygen sensor output voltage VAF is equal to or greater than 0.45 [V]. When it is determined that oxygen sensor output voltage VAF is equal to or greater than 0.45 [V], the process proceeds to step S21.

Then, in step S21, the air-fuel ratio feedback control means 20 calculates a corrected oxygen sensor output voltage VAFtmp as $$VAFtmp = (VAF - 0.45) \times Kgain + 0.45 \ [V]$$

and the process proceeds to step S23.

However, if it is determined in step S20 that the oxygen sensor output voltage VAF is smaller than 0.45 [V], the process proceeds to step S22.

Then, in step S22, the air-fuel ratio feedback control means 20 calculates the corrected oxygen sensor output voltage VAFtmp as $$VAFtmp = 0.45 - (0.45 - VAF) \times Kgain \ [V]$$

and the process proceeds to step S23.

Then, in step S23, the air-fuel ratio feedback control means 20 determines whether or not air-fuel ratio feedback control conditions have been established from the operating state of the engine. If air-fuel ratio feedback control conditions have been established, the process proceeds to step S24.

Then, in step S24, the air-fuel ratio feedback control means 20 calculates the proportional gain Gp on the basis of the corrected oxygen sensor output voltage VAFtmp, and the process proceeds to step S25. Further, in step S25, the air-fuel ratio feedback control means 20 calculates the integral gain Gi on the basis of the corrected oxygen sensor output voltage VAFtmp, and the process proceeds to step S26.

Then, in step S26, the air-fuel ratio feedback control means 20 uses the integral gain acquired in step 25 to calculate the total sum of integral gain using the following equation:

$$SGi(n)=SGi(n-1)+Gi$$

and the process proceeds to step S27.

Then, in step S27, the air-fuel ratio feedback control means 20 calculates the air-fuel ratio feedback control correction amount Kfb as $$Kfb=1.0+Gp+SGi$$

and the serial process is terminated.

However, if it is determined in step S23 that air-fuel ratio feedback control conditions have not been established, the process proceeds to step S28. Then, in step S28, the air-fuel ratio feedback control means 20 sets the air-fuel ratio feedback control correction amount Kfb to 1.0 and the integral gain sum value SGi to 0, and the serial process is terminated.

As described above, with the first embodiment, a configuration is provided in which air-fuel ratio feedback control is implemented on the basis of an air-fuel ratio feedback control correction amount. More specifically, a configuration is provided in which an oxygen sensor output voltage, which changes due to the influence of an exhaust temperature that changes in accordance with the operating state of a vehicle, is corrected and air-fuel ratio feedback control is performed without having to directly estimate and determine an oxygen sensor temperature.

As a result, air-fuel ratio feedback control can be accurately performed without the accumulation of error due to performing a plurality of calculations, deviation between an estimated temperature and the actual temperature, deviation in the oxygen sensor output voltage, etc.

Further, when determining an oxygen sensor output voltage correction coefficient using a test vehicle, the correction coefficient is determined while confirming the behaviour of the actual air-fuel ratio in accordance with the vehicle operating state. In other words, the input (the oxygen sensor output voltage) is adjusted while confirming the output result (actual air-fuel ratio) of the air-fuel ratio feedback control. As a result, the correction coefficient can be determined while taking into account calculation errors and response delays, etc. in air-fuel ratio feedback control and, in comparison to conventional methods, the oxygen sensor output voltage correction coefficient can be determined accurately, easily, and in a small number of man hours.

Further, with the first embodiment, it is not necessary to retain a plurality of calculations and data. For this reason, effects such as prevention of complication of the air-fuel ratio feedback control process, reduction in the capacity of the microcomputer, and alleviation of the processing load can be achieved.

Further, with the first embodiment, it is not necessary to directly estimate the oxygen sensor temperature. For this reason, preparation of a test vehicle for data measurement to be used in oxygen temperature estimation, as well as testing man hours for measuring the oxygen sensor temperature, are rendered unnecessary, such that the development period can be shortened.

Further, with the first embodiment, the input, which is the furthest upstream aspect of air-fuel ratio feedback control, is corrected by correcting the oxygen sensor output voltage, such that there is no need to change other aspects of air-fuel ratio feedback control. For this reason, the temperature characteristics of the oxygen sensor can be taken into consideration while effectively utilizing conventional assets.

Further, with the first embodiment, air-fuel ratio feedback control can be performed using an oxygen sensor that is already installed in a vehicle. As a result, accuracy of air-fuel ratio feedback control can be improved without changing the cost of the vehicle.

Further, with the first embodiment, a configuration is provided in which, when it is determined, on the basis of the operating state information, that the operating state of the vehicle is a state immediately after engine start-up, an oxygen sensor output voltage correction coefficient for immediately after engine start-up is calculated, and air-fuel ratio feedback control is implemented on the basis of an air-fuel ratio feedback control correction amount calculated using a corrected oxygen sensor output voltage value. As a result, the temperature of the oxygen sensor increases due to heat from the exhaust temperature immediately after engine start-up, a heater incorporated in the oxygen sensor, or both and, in the period up until the oxygen sensor temperature saturates, the temperature characteristics of the oxygen sensor are corrected, whereby convergence to the stoichiometric air-fuel ratio can be accelerated in air-fuel ratio feedback control.

Further, with the first embodiment, a configuration is provided in which, when it is determined, on the basis of the operating state information, that the operating state of the vehicle is a state in which the vehicle is accelerating, an oxygen sensor output voltage correction coefficient for acceleration is calculated, and air-fuel ratio feedback control is implemented on the basis of an air-fuel ratio feedback control correction amount calculated using a corrected oxygen sensor output voltage value. As a result, even when the vehicle is accelerating and supply of fuel to the engine increases, the exhaust temperature decreases due to the actual air-fuel ratio becoming rich, and the temperature of the oxygen sensor decreases as a result thereof, the temperature characteristics of the oxygen sensor are corrected, whereby air-fuel ratio feedback control can be performed accurately.

Further, with the first embodiment, a configuration is provided in which, when it is determined, on the basis of the operating state information, that the operating state of the vehicle is a state in which the vehicle is decelerating, an oxygen sensor output voltage correction coefficient for deceleration is calculated, and air-fuel ratio feedback control is implemented on the basis of an air-fuel ratio feedback control correction amount calculated using a corrected oxygen sensor output voltage value. As a result, even when the vehicle is decelerating and an amount of air taken into the engine decreases, the exhaust temperature changes, and the temperature of the oxygen sensor changes as a result thereof, the temperature characteristics of the oxygen sensor are corrected, whereby air-fuel ratio feedback control can be performed accurately.

Further, with the first embodiment, a configuration is provided in which, when it is determined, on the basis of the operating state information, that the operating state of the vehicle is a state in which fuel cut is in progress, an oxygen sensor output voltage correction coefficient for when fuel cut is in progress is calculated, and air-fuel ratio feedback control is implemented on the basis of an air-fuel ratio feedback control correction amount calculated using a corrected oxygen sensor output voltage value. As a result, even when the exhaust temperature decreases due to fuel cut, fuel cut is terminated after the temperature of the oxygen sensor decreases, and air-fuel ratio feedback is resumed, the temperature characteristics of the oxygen sensor are corrected, whereby air-fuel ratio feedback control can be performed accurately.

Further, with the first embodiment, a configuration is provided in which an oxygen sensor output voltage correction coefficient is calculated in accordance with an engine temperature acquired from the operating state information, and air-fuel ratio feedback control is implemented on the basis of an air-fuel ratio feedback control correction amount calculated using a corrected oxygen sensor output voltage value. As a result, even when the exhaust temperature changes due to the wall surface temperature of the engine of the vehicle and the oxygen sensor temperature changes as a result thereof, the temperature characteristics of the oxygen sensor are corrected, whereby air-fuel ratio feedback control can be performed accurately.

Further, with the first embodiment, a configuration is provided in which a variation in the engine rotation speed is calculated from an engine rotation speed acquired from the operating state information and, when it is determined that the variation in the engine rotation speed is large, an oxygen sensor output voltage correction coefficient for when engine rotation fluctuates is calculated, and air-fuel ratio feedback control is implemented on the basis of an air-fuel ratio feedback control correction amount calculated using a corrected oxygen sensor output voltage value. As a result, even when the exhaust temperature changes due to the change in engine rotation speed of the vehicle being large and the temperature of the oxygen sensor changes as a result thereof, the temperature characteristics of the oxygen sensor are corrected, whereby air-fuel ratio feedback control can be performed accurately.

Further, with the first embodiment, a configuration is provided in which an oxygen sensor output voltage correction coefficient is calculated in accordance with an operating region determined in accordance with an intake air amount and an engine rotation speed acquired from the operating state information, and air-fuel ratio feedback control is implemented on the basis of an air-fuel ratio feedback control correction amount calculated using a corrected oxygen sensor output voltage value. As a result, even when the oxygen sensor temperature changes due to the exhaust temperature which changes in each operating region, the temperature characteristics of the oxygen sensor are corrected, whereby air-fuel ratio feedback control can be performed accurately.

Further, with the first embodiment, a configuration is provided in which, when a determination as to whether or not the oxygen sensor has been activated is performed and it is determined that the oxygen sensor has been activated, an oxygen sensor output voltage correction coefficient for when it is determined that the oxygen sensor has been activated is calculated, and air-fuel ratio feedback control is implemented on the basis of an air-fuel ratio feedback control correction amount calculated using a corrected oxygen sensor output voltage value. As a result, after the temperature of the oxygen sensor increases due to heat from the exhaust, heat from a heater incorporated into the oxygen sensor, or heat from both and it is determined that the oxygen sensor has been activated, the temperature characteristics of the oxygen sensor are corrected during the period up until the oxygen sensor temperature saturates, whereby air-fuel ratio feedback control can be performed accurately.

Further, with the first embodiment, a configuration is provided in which, when a determination is performed, prior to commencement of air-fuel ratio feedback control and in accordance with a voltage of the oxygen sensor, as to whether the actual air-fuel ratio, which is the actual air-fuel ratio inside the exhaust pipe, is rich or lean and it is determined that a state in which the actual air-fuel ratio is lean has continued for a fixed time period, an oxygen sensor output voltage correction coefficient for when the air-fuel ratio is lean prior to commencement of air-fuel ratio feedback control is calculated, and air-fuel ratio feedback control is implemented on the basis of an air-fuel ratio feedback control correction amount calculated using a corrected oxygen sensor output voltage value. As a result, even when the exhaust temperature changes in accordance with the actual air-fuel ratio prior to commencement of air-fuel ratio feedback control and the oxygen sensor temperature changes as a result thereof, the temperature characteristics of the oxygen sensor are corrected, whereby air-fuel ratio feedback control can be performed accurately.

Further, with the first embodiment, a configuration is provided in which, when a determination is performed, prior to commencement of air-fuel ratio feedback control and in accordance with a voltage of the oxygen sensor, as to whether the actual air-fuel ratio is rich or lean and it is determined that a state in which the actual air-fuel ratio is rich has continued for a fixed time period, an oxygen sensor output voltage correction coefficient for when the air-fuel ratio is rich prior to commencement of air-fuel ratio feedback control is calculated, and air-fuel ratio feedback control is implemented on the basis of an air-fuel ratio feedback control correction amount calculated using a corrected oxygen sensor output voltage value. As a result, even when the exhaust temperature changes in accordance with the actual air-fuel ratio prior to commencement of air-fuel ratio feedback control and the oxygen sensor temperature changes as a result thereof, the temperature characteristics of the oxygen sensor are corrected, whereby air-fuel ratio feedback control can be performed accurately.

What is claimed is:
1. An engine control device comprising:
various sensors to detect operating state information of an engine, the operating state information including an engine temperature, an engine rotation speed, and a throttle opening degree;
an oxygen sensor, the output voltage value of which changes in response to a concentration of oxygen in exhaust gas of the engine; and
air-fuel ratio feedback controller to adjust an amount of fuel injected into the engine, on the basis of the operating state information and the output voltage value, wherein
the air-fuel ratio feedback controller calculates, in accordance with the operating state information based on detection results from the various sensors, an oxygen sensor output voltage correction coefficient, which is a coefficient for correcting the output voltage value, implements air-fuel ratio feedback control on the basis of an air-fuel ratio feedback control correction amount calculated using a corrected oxygen sensor output voltage value calculated on the basis of the oxygen sensor output voltage correction coefficient, and adjusts the amount of fuel injected into the engine, and
wherein the air-fuel ratio feedback controller includes a correction coefficient calculator to calculate the oxygen sensor output voltage correction coefficient in accordance with the operating state information, by determining, on the basis of the operating state information, an operating state of a vehicle among a plurality of predetermined operating states, and calculating an oxy- gen sensor output voltage correction coefficient corresponding to the determined current operating state.

2. The engine control device according to claim 1, wherein
the air-fuel ratio feedback controller further includes:
an output voltage corrector to calculate the corrected oxygen sensor output voltage value on the basis of the oxygen sensor output voltage correction coefficient;
a proportional gain calculator to determine a proportional gain on the basis of the corrected oxygen sensor output voltage value;
an integral gain calculator to determine an integral gain on the basis of the corrected oxygen sensor output voltage value; and
a correction amount calculator to determine the air-fuel ratio feedback control correction amount on the basis of the proportional gain and the integral gain.

3. The engine control device according to claim 2, wherein
when the correction coefficient calculator determines, on the basis of the operating state information, that the operating state of the vehicle is a state immediately after engine start-up, the correction coefficient calculator calculates an oxygen sensor output voltage correction coefficient for immediately after engine start-up.

4. The engine control device according to claim 2, wherein
when the correction coefficient calculator determines, on the basis of the operating state information, that the operating state of the vehicle is a state in which the vehicle is accelerating, the correction coefficient calculator calculates an oxygen sensor output voltage correction coefficient for acceleration.

5. The engine control device according to claim 2, wherein
when the correction coefficient calculator determines, on the basis of the operating state information, that the operating state of the vehicle is a state in which the vehicle is decelerating, the correction coefficient calculator calculates an oxygen sensor output voltage correction coefficient for deceleration.

6. The engine control device according to claim 2, wherein
when the correction coefficient calculator determines, on the basis of the operating state information, that the operating state of the vehicle is a state in which fuel cut is in progress, the correction coefficient calculator calculates an oxygen sensor output voltage correction coefficient for when fuel cut is in progress.

7. The engine control device according to claim 2, wherein
the correction coefficient calculator calculates the oxygen sensor output voltage correction coefficient in accordance with the engine temperature acquired from the operating state information.

8. The engine control device according to claim 2, wherein
the correction coefficient calculator calculates a variation in engine rotation speed from the engine rotation speed acquired from the operating state information and, when it is determined that the variation in engine rotation speed is larger than a pre-set determination value, calculates an oxygen sensor output voltage correction coefficient for when engine rotation fluctuates.

9. The engine control device according to claim 2, wherein
the correction coefficient calculator calculates the oxygen sensor output voltage correction coefficient in accordance with an operating region determined by an intake air amount and the engine rotation speed acquired from the operating state information.

10. The engine control device according to claim 2, wherein
the correction coefficient calculator determines whether or not the oxygen sensor has been activated and, when it is determined that the oxygen sensor has been activated, calculates an oxygen sensor output voltage correction coefficient for when it is determined that the oxygen sensor has been activated.

11. The engine control device according to claim 2, wherein
prior to commencement of air-fuel ratio feedback control, the correction coefficient calculator determines whether an actual air-fuel ratio, which is an actual air-fuel ratio inside an exhaust pipe, is rich or lean in accordance with a voltage of the oxygen sensor and, when it is determined that a state in which the actual air-fuel ratio is lean has continued for a fixed time period, calculates an oxygen sensor output voltage correction coefficient for when the actual air-fuel ratio is lean prior to commencement of air-fuel ratio feedback control.

12. The engine control device according to claim 2, wherein
prior to commencement of air-fuel ratio feedback control, the correction coefficient calculator determines whether an actual air-fuel ratio, which is an actual air-fuel ratio inside an exhaust pipe, is rich or lean in accordance with a voltage of the oxygen sensor and, when it is determined that a state in which the actual air-fuel ratio is rich has continued for a fixed time period, calculates an oxygen sensor output voltage correction coefficient for when the actual air-fuel ratio is rich prior to commencement of air-fuel ratio feedback control.

13. The engine control device according to claim 9, wherein
the correction coefficient calculator determines the intake air amount from the throttle opening degree acquired from the operating state information.

14. The engine control device according to claim 9, wherein
the correction coefficient calculator determines the intake air amount from an intake air pressure acquired from the operating state information.

15. An engine control method executed by air-fuel ratio feedback controller in an engine control device provided with:
various sensors to detect operating state information of an engine, the operating state information including an engine temperature, an engine rotation speed, and a throttle opening degree;
an oxygen sensor, the output voltage value of which changes in response to a concentration of oxygen in exhaust gas of the engine; and
the air-fuel ratio feedback controller to adjust an amount of fuel injected into the engine, on the basis of the operating state information and the output voltage value,
the engine control method comprising:
calculating, in accordance with the operating state information based on detection results from the various sensors, an oxygen sensor output voltage correction coefficient, which is a coefficient for correcting the output voltage value;

calculating an air-fuel ratio feedback control correction amount using a corrected oxygen sensor output voltage value calculated on the basis of the oxygen sensor output voltage correction coefficient; and implementing air-fuel ratio feedback control on the basis of the air-fuel ratio feedback control correction amount and adjusting the amount of fuel injected into the engine, wherein the calculating the oxygen sensor output voltage correction coefficient comprises determining, on the basis of the operating state information, an operating state of a vehicle among a plurality of predetermined operating states, and calculating an oxygen sensor output voltage correction coefficient corresponding to the determined current operating state.

* * * * *